(12) United States Patent
Ashley et al.

(10) Patent No.: US 6,484,780 B2
(45) Date of Patent: Nov. 26, 2002

(54) CARD LAMINATOR AND METHOD OF CARD LAMINATION

(75) Inventors: Keith R. Ashley, Clark, NJ (US); Igor Pankiw, Hillside, NJ (US); Wesley L. Burrowes, River Edge, NJ (US)

(73) Assignee: Card Technology Corporation, Paramus, NJ (US)

( * ) Notice: Subject to any disclaimer, the term of this patent is extended or adjusted under 35 U.S.C. 154(b) by 0 days.

(21) Appl. No.: 09/813,146

(22) Filed: Mar. 21, 2001

(65) Prior Publication Data

US 2002/0134516 A1 Sep. 26, 2002

(51) Int. Cl.[7] .................. B44C 1/165; B32B 31/20; B30B 15/34; B41M 3/12; B65C 9/25
(52) U.S. Cl. .................. 156/540; 156/552; 156/582; 156/583.1; 156/384; 156/390; 156/443; 156/538; 156/230; 156/235; 156/237; 156/277
(58) Field of Search .................. 156/230, 235, 156/237, 240, 241, 247, 277, 289, 390, 350, 443, 540, 541, 582, 580, 583.1, 384, 538

(56) References Cited

U.S. PATENT DOCUMENTS

| | | | |
|---|---|---|---|
| 3,896,726 A | 7/1975 | Staats | 101/369 |
| 3,987,725 A | 10/1976 | Scantlin | 101/128.4 |
| 4,060,441 A | * 11/1977 | Ohta et al. | 156/234 |
| 4,285,747 A | 8/1981 | Rega | 156/164 |
| 4,598,448 A | 7/1986 | Schiel et al. | 29/116 |
| 4,741,922 A | 5/1988 | Wales et al. | 427/130 |
| 5,070,781 A | 12/1991 | Lundstrom et al. | 101/32 |
| 5,294,279 A | 3/1994 | Kuhns et al. | 156/324.4 |
| 5,724,845 A | 3/1998 | Yasumi et al. | 72/161 |
| 5,783,024 A | * 7/1998 | Forkert | 156/351 |
| 5,837,991 A | 11/1998 | LaManna et al. | 235/475 |
| 5,946,961 A | 9/1999 | Stone | 72/178 |
| 6,030,474 A | * 2/2000 | Isono et al. | 156/64 |
| 6,261,012 B1 | * 7/2001 | Haas et al. | 400/208 |

* cited by examiner

Primary Examiner—Jerry A. Lorengo
(74) Attorney, Agent, or Firm—Antonelli, Terry, Stout & Kraus, LLP

(57) ABSTRACT

The invention is a laminator and a method of lamination of a plastic card (14). A laminator (10, 100) in accordance with the invention includes an infeed (12) which supplies plastic cards which are to be laminated with a plastic laminating material on a first side (18) of each card; a laminating station (20) having a heated roller (22, 114) and a card support (24, 112), opposed to the heated roller, which supports a second side of each card and is separated from the heated roller to define a card opening (28, 116) through which each plastic card passes when being laminated; a laminate source (32) which feeds plastic laminating material into the card opening between the heated roller and the first side of each plastic card with heat from the heated roller heating the plastic laminating material and each plastic card in the card opening to fuse the plastic laminating material to the first surface of each plastic card; and a card bowing the station (40), which bows each card sufficiently in a portion thereof to cause each card when cooled to be substantially flat.

30 Claims, 5 Drawing Sheets

CARD LAMINATOR AND METHOD OF CARD LAMINATION

BACKGROUND OF THE INVENTION

1. Field of the Invention

The present invention relates to laminators and methods of lamination for fusing a plastic laminate to a surface of a card to protect the surface against wear so as to protect sensitive indicia thereon such as pictures.

2. Description of the Prior Art

The Assignee of the present invention and other companies sell credit card embossing and printing (personalization) systems which are designed to perform a series of processes which transform a blank card, such as a credit card blank, into a processed card. The processes performed by credit card embossing and printing systems are not limited to embossing credit cards and use a number of processing stations all of which are not required to be activated when flat non-embossed cards are being processed.

Processing of plastic cards performed by the largest credit card embossing systems, is at very high speeds which can result in a throughput of fully processed cards at a rate up to 1500 cards per hour. U.S. Pat. No. 5,837,991, which is assigned to the Assignee of the present invention, is exemplary of the foregoing type of credit card system which patent is incorporated herein by reference in its entirety.

It is also well known that printing and photographs on a plastic card surface may be protected by the heat fusing of a clear plastic laminate to the card surface on which the printing and photographs are placed.

Data Card Corporation has sold a Model 9000 embossing system which included a laminator which laminated the top surface of flat non-embossed cards with a clear plastic laminate by heat fusing. The clear plastic laminate protected a photographic image of the authorized user of the card. The Data Card system, as a consequence of the laminating operation, introduced heat stress into the plastic card to which the plastic laminate is fused. If the resultant heat stress in the laminated plastic card was not removed, the laminated card was not substantially flat after cooling.

The Data Card Corporation Model 9000, when operating to laminate cards, transports the cards along a horizontal transport path with the individual cards having their width aligned with the transport path. The longitudinal dimension of the cards during processing at the card processing stations is vertically oriented.

The Data Card Model 9000 system laminator included a bowing device which, after lamination, applied a vertical compressive force to both vertically oriented longitudinal ends of the laminated card which retained heat from the lamination. The middle portion of the laminated card was free to bow with the bowing being caused by reducing the longitudinal dimension of the card by the force applied to the ends. The compressive force countered the effect of the heat induced stress by reversing the effect of the bow along the longitudinal dimension introduced by the heat of the lamination operation.

The Assignee of the present invention manufactures a color printer used in its HORIZON embossing system which is described, with the exception of the color printer, in the above-referenced patent. The color printer includes an infeed, a color printing station and an outfeed. The infeed has a pair of driven rollers and a pair of opposed idler rollers between which cards pass during the infeed of cards, such as processed credit cards, to the color printing station. The activation of the infeed rollers causes the card to be moved along a transport path underneath the printhead which, under control of a system controller, applies a color image to at least a portion of the processed card which typically is the side of the card on which the embossing may appear. A second pair of driven rollers is on an outfeed side of the printing station. A corresponding pair of offset idler rollers defines a gap between which the processed credit card bearing the color image passes. The outfeed conveys the printed card to another card processing station when the color printer is part of a HORIZON embossing system or a card collection station. The drive of the first and second pairs of rollers is synchronized such that at least one driven roller is always contacting the card as the card is moved through the color printer to produce uniform movement underneath the printhead.

SUMMARY OF THE INVENTION

The present invention is a laminator and a method of laminating flat plastic cards with a clear plastic laminating material in order to protect a photographic image or sensitive printing on a side of the plastic card. As used herein, plastic laminating material is any plastic material, regardless of thickness, which is heat fused to a plastic card which may be carried by a web or be transferred by a thermal transfer method from a continuous web to provide full edge to edge coverage of the card surface. A laminator as used herein applies the plastic laminating material to a plastic card. The plastic card may be, without limitation, a flat (non-embossed) PVC (or other plastic) card and the plastic laminate may be dimensioned to cover substantially all of or only a portion of a surface of the plastic card bearing a printed or a photographic image to be protected. The plastic cards which may be laminated with the invention commercially take many forms including, but not limited to, a non-embossed credit or debit card, a laser engraved credit or debit card, an identification card, and an access card. The clear plastic laminating material may provide a useful life to the printing or photographic image of up to five years.

The invention utilizes a laminating station having a heated roller which applies heat to a first side of a plastic laminating material (which may be, without limitation, a clear polyester overlay with a thickness of, for example, of 0.0002 inches or a clear polyester laminate between 0.0005 and 0.001 inches in thickness) which causes a second side of the plastic laminating material to be heat fused to a first side of the card and a card bowing station located at an outfeed of the laminating station which removes residual heat stress in the card to which the clear plastic laminating material has been fused by applying a bow transversely across a portion (which may be the middle) of the second side of the card relative to a direction of movement of the card through the laminator. The ends of the heated laminated card are fixed while the middle portion is bowed which results in the applied bow deflecting the card in a direction which is opposite to the direction of a heat set bow which would result after cooling of the laminated card if the card bowing station was not utilized. The bow (degree of deflection of the bow from the horizontal, as well as the timing thereof, or the length of the time the bow is applied) applied at the card bowing station is chosen to be sufficient to cause the card when cooled to be substantially flat and is dependent upon the physical properties of the plastics used in the card and the clear plastic laminating material and the physical dimensions of the card and a clear plastic laminate if used as the laminating material. Movement of each card through the laminator is synchronized by a system controller which may be part of the system controller of a card embossing system that produces a high throughput of processed cards without activation of the embossing station. Furthermore, as a result of the card bowing station being located on the outfeed side of the laminating station, the laminated plastic card is sufficiently heated to apply the bow to the card while the molecular structure of the plastic is relatively soft as a consequence of the retained heat. The application of the bowing force, if the laminated card was not in an elevated temperature, would require additional force and deflection which is not required with the present invention in view of the proximity of the card bowing station to the laminating station which results in the card having been heated at the time that bowing at the card bowing station occurs.

In a preferred embodiment of the present invention, the card transport system of the present invention may be that utilized in the Assignee's color printing assembly used in the Assignee's HORIZON embosser which is used therein without the embossing station being activated. Currently, it is not possible to commercially laminate an embossed surface of a credit card because the embossed characters cause the heat fused clear plastic laminating material to crack over the useful life of the credit card thus increasing the cost of credit card issuance. In one embodiment of the invention, the card printing assembly of the Assignee is modified to remove the card printing head and in place thereof, to incorporate the laminating station which lowers the cost of the laminator as a result of the card transport system being common to the Assignee's color printer assembly and to the laminator of the present invention.

A laminator in accordance with the invention includes an infeed which supplies plastic cards which are to be laminated with a plastic laminating material on a first side of each card; a laminating station having a heated roller and a card support, opposed to the heated roller, which supports a second side of each plastic card and is separated from the heated roller to define a card opening through which each plastic card passes when being laminated; a plastic laminating material source which feeds plastic laminating material into the card opening between the heated roller and the first side of each plastic card with heat from the heated roller heating the plastic laminating material and each plastic card in the card opening to fuse the plastic laminating material to the first surface of each plastic card to produce laminated plastic cards; and a card bowing station, located at an outfeed of the laminating station, including a resilient member which moves from a withdrawn position into transverse contact with a portion of the second side of each plastic card relative to a direction of movement of each plastic card through the laminator, while each laminated plastic card retains heat from being laminated, to bow each plastic card sufficiently in the middle portion to cause each laminated plastic card when cooled to be substantially flat. A web may provide the plastic laminating material which is heat fused onto the first side of each card; a source reel may be used on which the web is wound; and a take up reel may be used on which the web is wound after the plastic laminating material is fused to the first side of the plastic cards. At least three driven rollers may be used which contact one side of each card wherein at least one driven roller is located along a card transport path at the infeed and a pair of driven rollers are disposed along the card transport with a-first driven roller of the pair of driven rollers being located between the heated roller and the resilient member and the second driven roller of the pair of driven rollers being located at the outfeed of the card bowing station. The at least three rollers may be driven by a transmission driven by one motor. At least three idler rollers may be used which contact each card on another side of each card and are individually opposed to the individual driven rollers of the at least three driven rollers, with each card passing between the driven and opposed roller when driven by each driven roller contacting the one side of each card and the opposed idler roller contacting the another side. The laminator may include a controller and first, second and third motors; and wherein the first motor drives the at least three driven rollers, the second motor drives the resilient member, and the third motor moves the heated roller into contact with the laminating material and the controller controls activation of the motors. The first motor may be activated under control of the controller to drive each card along the card transport path to drive each card past the heated roller and into a stopped position where each card is contacted by the pair of driven rollers and after each card is in the stopped position, the second motor may be activated under control of the controller to move the part including the resilient member to bow the portion thereof. The laminator may be part of a credit card processing and printing (personalization) system. The resilient member may reciprocate and the transverse contact may be with a middle portion of the second side. The laminating material may be a series of plastic laminates which are spaced apart on a carrying web with the laminates being transferred from the web to the first side of the plastic cards by the heat from the heated roller or the laminating material may be a continuous coating on one side of a carrying web with the laminating material being transferred from the web to the first side of the cards by the heat from the heated roller.

A method of laminating a card with a laminator having an infeed which supplies cards which are to be laminated with a plastic laminating material on a first side of each card, a laminating station having a heated roller and a card support, opposed to the heated roller, which supports a second side of each card and is separated from the heated roller to define a card opening through which each card passes when being laminated, a laminating material source which feeds laminating material into the card opening between the heated roller and the first side of each card, and a card bowing station, located at an outfeed of the laminating station, including a resilient member which moves from a withdrawn position into transverse contact with a portion of the second side of each card relative to a direction of movement of the plastic card through the laminator in accordance with the invention includes feeding a plastic card from the infeed to the laminating station; supplying a plastic laminating material to the laminating station from the laminating material source and heating a first side of the plastic laminating material with the heated roller which fuses a plastic laminating material to the plastic card to produce a laminated card; feeding the laminated card to the bowing station while the laminated card retains heat from the lamination thereof; and moving the resilient member to transversely contact a portion of the second side to bow the card sufficiently in the portion to cause the laminated card to be substantially flat. The plastic laminating material may be conveyed to the laminating station by a web which carries the plastic laminating material and the heated roller contacts the web which heats the plastic laminating material to fuse the plastic laminating material to the first side of the plastic card. At least three driven rollers may be disposed along a transport path of the card through the laminator with each driven roller contacting one side of the plastic card with at least one of the driven rollers being located at the infeed and a first roller of the pair of rollers being located between the heated roller and the resilient member and a second driven roller of the pair of driven rollers being located on an outfeed of the card bowing station and at least three opposed idler rollers may be disposed along the transport path with the plastic card passing between the driven and opposed roller when driven by each driven roller contacting the one side of the card and the opposed idler roller contacting another side of the plastic card; and wherein the second pair of driven rollers may be stopped to cause the plastic card to be held between the second pair of driven rollers and the opposed idler rollers to fix longitudinal ends of the plastic card while the resilient member bows the portion of the plastic card. The laminator may include a controller and first, second and third motors are provided; and wherein the first motor drives the at least three driven rollers, the second motor drives the resilient member, and the third motor moves the heated roller into contact with the laminating material and the controller controls activation of the motors. The first motor may be activated under control of the controller to drive each plastic card along the card transport path to drive each plastic card past the heated roller and into a stopped position where each plastic card may be contacted by the pair of driven rollers and after each plastic card is in the stopped position, the second motor may be activated under control of the controller to move the resilient member to bow the portion. The card which is laminated may be an one of a credit card, a laser engraved card, a debit card, an identification card or an access card. The part may be a reciprocating part and the transverse contact may be with a middle portion of the second side. The laminating material may be a series of plastic laminates which are spaced apart on a carrying web with the laminates being transferred from the web to the first side of the plastic cards by the heat from the heated roller or the laminating material may be a continuous coating on one side of a carrying web with the laminating material being transferred from the web to the first side of the cards by the heat from the heated roller.

BRIEF DESCRIPTION OF THE DRAWINGS

Like parts are identified by like reference numerals throughout the drawings.

DESCRIPTION OF THE PREFERRED EMBODIMENTS

Figure 1:
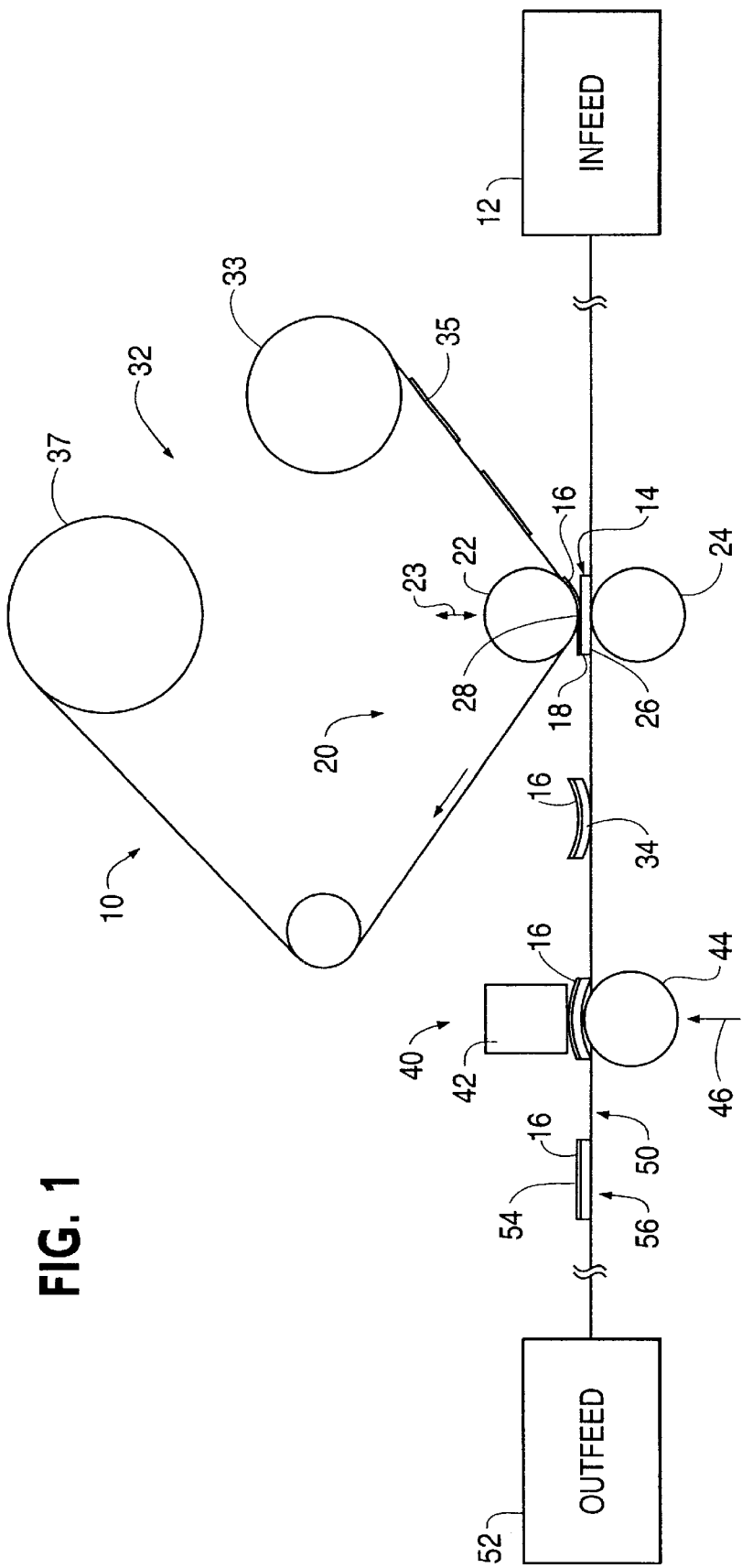
FIG. 1 illustrates a simplification of the processing performed by a laminator in accordance with the present invention.

FIG. 1 illustrates a conceptual embodiment of the invention having a laminator 10 which heat fuses a clear plastic laminating material in the form of a clear plastic laminate 16 such as the aforementioned clear polyester laminate of 0.0002 to 0.001 inches in thickness to a surface of a plastic card 14 in accordance with the invention. The clear plastic laminating material 16 protects printing or a photographic image on the top surface of the card to extend the useful life of the card for a period of up to, for example, five years. The laminator 10 has an infeed 12 which is a source of cards and may be a card processing station of a credit card embossing system, such as that disclosed in the aforementioned U.S. Pat. 5,837,991 of the Assignee which is not embossing characters on the cards, or any known stand alone known design of a card supply hopper. The infeed 12 supplies plastic cards 14 which are conveyed by card transport 50 to a laminating station 20 where the plastic cards are laminated with the plastic laminating material 16 on a first side 18 of each card. The clear plastic laminating material 16 is illustrated as being separate from the carrying web 35. However, it should be understood that the clear plastic laminating material may be heat transferred from the web 35 which is continuously coated with a clear plastic which heat transfers to the first side 18 of each card to produce and edge to edge coating.

The laminating station 20 has a motor driven heated roller 22 and a motor driven card support 24, opposed to the heated roller. The heated roller 22 is reciprocated between a withdrawn position to an engaged position as illustrated as indicated by bidirectional arrow 23. A motor (not illustrated) drives an eccentric drive to produce the reciprocation as indicated by arrow 23. The card support 24 supports a second side 26 of each card 14 during heat fusing of the clear plastic laminating material in the form of laminates 16 to the first side 18 of the card. The card support 24 is separated from the heated roller by a space defining a card opening 28 through which each card passes when being laminated.

A laminating material source 32 feeds clear plastic laminating material having laminates 16 or the web 35 coated with heat transferrable laminating material into the card opening 28 between the heated roller 22 and the first side 18 of each card. The heated roller heats the clear plastic laminating material and each card 14 at the card opening 28 to cause fusing of the clear plastic laminating material to the first surface 18 of each card. A supply reel 33 provides a web 35 carrying the plastic laminates 16 or the web 35 coated with heat transferrable laminating material until the plastic laminates or heat transferrable laminating material are fused to the surface 18 by the heat from the heated roller. A take up reel 37, which has a slip clutch contained therein (not illustrated), limits the amount of torque applied to the web by a web reel take up motor 204, as described with reference to FIG. 4, after passing from contact with the heated roller 22 to keep a steady tension on the web 35 regardless of the outside diameter of the roll of web material on the take up reel.

As illustrated at point 34, but which does not actually happen in the preferred embodiment of the present invention described below in conjunction with FIGS. 2 and 3, the application of heat from the heated roller 22 to the laminate 16 or web 35 coated with heat transferrable material to heat fuse the plastic laminate or the heat transferrable material to the top surface 18 of the plastic card 14 causes heat strain which, if released, would cause the card to bow as illustrated. However, with an inline system as described in the preferred embodiments of the invention hereinafter, the bow as illustrated at point 34 never occurs as a consequence of the laminated card being driven directly from the opening 28 between the motor driven heated roller 22 and the motor driven support 24 to a position at which the ends of the card are held between a-pair of driven rollers and opposed idler rollers (illustrated in FIGS. 2 and 3) at card bowing station 40.

The card bowing station 40 has a stop 42 which defines the maximum amount of bow available to reverse the heat induced stress which is applied by the upward movement of a reciprocating part 44 as indicated by arrow 46. As a consequence of the plastic card 14 and fused plastic laminate 16 or heat transferred laminating material carried by the web retaining heat at the card bowing station 40 as described below, a relatively small amount of upward bow is sufficient to reverse the heat induced stress produced by the laminating operation of the clear plastic laminate 16 or clear plastic laminating material carried by the web to the plastic card by the heated roller 22. After processing is complete at the card bowing station 40, the laminated plastic card 56 is fed along the transport path 50 to an outfeed 52 which may be a card collection hopper or another card processing station in an embossing system in accordance with the aforementioned U.S. Pat. No. 5,837,991. As is apparent at point 54, the completely processed card 56 is substantially flat after leaving the bowing station 40.

The processing performed by the laminator 10 has advantages over the prior art. In the first place, it is readily integrated into an inline card processing system such as without limitation, an embossing or printing system having high throughput, such as the embossing system as described in the aforementioned U.S. Pat. No. 5,837,991 when processing of flat cards which are not embossed is performed. Furthermore, the system is mechanically simple and in a preferred embodiment, utilizes a card transport mechanism substantially in common with the Assignee's commercially available color printer which is utilized in the Assignee's HORIZON™ embossing system. Additionally, a laminator 10 in accordance with the present invention is equally applicable as a stand alone laminator, which is not part of a card processing system such as a credit card embosser, and may be used to apply clear plastic laminating material to flat non-embossed plastic cards processed in a credit card embossing system to protect sensitive printing or color photographs thereon.

Figure 2:
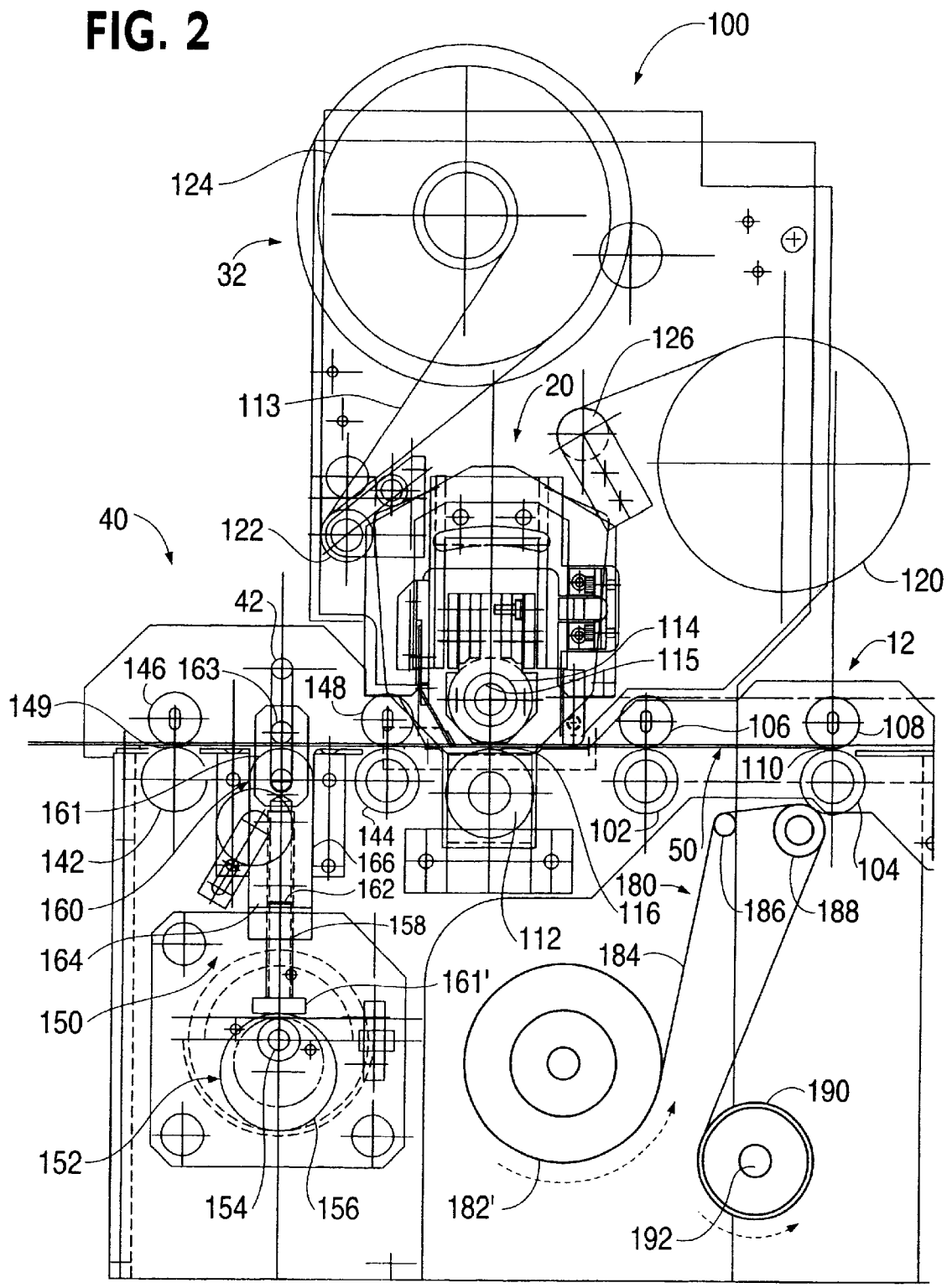
FIG. 2 illustrates an elevational view of an embodiment of a laminator in accordance with the present invention.

FIG. 2 illustrates an elevational view of an embodiment 100 of a laminator in accordance with the present invention. A first pair of driven rollers 102 and 104 and spring loaded opposed idler rollers 106 and 108 are located at the infeed 12. The spring loaded idler rollers 106 and 108 are biased together by the spring force but are separated to engage the sides of the card when the transport system conveys the card toward the laminating station 20. While a pair of driven rollers 102 and 104 is illustrated, the present invention may be practiced with only a single driven roller and spring loaded opposed idler roller on the infeed side depending upon the spacing between the driven rollers on the infeed and outfeed side of the motor driven heated roller 114. The axle 115 of the motor driven roller 114 is the heating element. Two driven rollers 102 and 104 are preferred. The pair of spring loaded idler rollers 106 and 108 are displaced from contact with the rollers 102 and 104 by the card (not illustrated) to define a card opening 110 between which each plastic card passes when driven by each driven roller contacting the bottom side of each card and each idler roller contacting the top side of each card. The motor driven roller 112 and the motor driven heated roller 114 are separated to define card opening 116 through which individual plastic cards pass while the plastic laminate 16 or laminating material coated on a web is laminated to the top surface 18 of the plastic card 14 by the heated roller 114 as illustrated in FIG. 1 (but not illustrated herein because of spatial considerations). The laminating material source 32 is comprised of a web 113 which carries the individual laminates 16 (not illustrated or is continuously coated with heat transferable laminating material). A roll of the web 113 carrying individual laminates or coated with laminating material is wound on source reel 120. The web 113 is fed from the source reel 120, after passing from contact with the motor driven heated roller 114, into surface contact with roller 122 which is motor driven but may be an idler and around motor driven take up reel 124 on which the web is wound after the individual laminates 16 or heat transferrable laminating material have been released from the web by heat fusing to the top surface 18 of the cards 14. The take up reel 124 is driven by the take up reel motor 204 as described below in conjunction 204 with FIG. 4. A transmission (not illustrated) connects the take up reel motor 204 to rotate the take up reel 124. The transmission driving the take up reel 124 includes a slip clutch (not illustrated) to limit the tension on the web 113 to smoothly pull the web carrying individual laminates or a heat transferrable material into contact with the heated roller 114. The bowing station 40 has a pair of driven rollers 142 and 144 and a pair of opposed idler rollers 146 and 148 which function in the same manner as the pair of driven rollers 102 and 104 and the idler rollers 106 and 108 of the infeed 12 to define an opening 149 through which the laminated cards pass by contacting the driven and idler roller. Each of the two pairs of driven rollers 102, 104, 142 and 144 and the driven roller 112 is driven by a common motor and drive transmission, as described below in conjunction with FIG. 3, to synchronize movement of cards along the transport path 50 of the laminator. The bowing station includes part 150, which includes an eccentric drive 152 having a shaft 154 driven by a transmission (not illustrated) driven by a card bowing motor 200 as described below in conjunction with FIG. 4. The eccentric drive drives cam 156 which, when rotating eccentrically relative to driven shaft 154, causes follower 158, to move upward in direction 46, as illustrated in FIG. 1, to cause resilient member assembly 160 to move from the withdrawn position, as illustrated in FIG. 2, to the bowing position, as illustrated in FIG. 1, to apply an upward bow to the laminated card to remove the residual heat stress therein. While a preferred mechanism to bow the heat stressed laminated card is as illustrated which reciprocates a reciprocating part with an eccentric drive to transversely contact a middle portion of the laminated card, it is alternatively within the scope of the invention to bow the card by rotation of a non-reciprocating member which transversely contacts the card across a substantial longitudinal portion of the length of the card to spread the bowing force over more card area producing a more even bow to straighten the card. The resilient member assembly 160 has a lower roller 161 and an upper roller 163 between which the laminated card is located during bowing so that pinching of the longitudinal ends of the card by the roller pairs 142 and 146 and 144 and 148 results in the middle transverse portion of the heat retaining laminated card being held during upward bowing. As a consequence of the laminated card being immediately conveyed by the card transport 50 from the laminator 20 to the bowing station 40, the residual heat in the laminated card facilitates the removal of the thermal stress therein by the upward movement of the resilient member 160 contacting the bottom surface 26 of the card as illustrated in FIG. 1. The overall length of the follower 158 is adjustable by turning of the threaded member 161' to engage threads 162 within the tapped bore 164 of block 166 which is part of the reciprocating part 150.

Lint and other debris can be attracted and stick to plastic cards due to the static charge that can buildup thereon. Lint and debris can cause poor printing, overlay and laminate application quality. It is therefore desired to remove the lint and debris from plastic cards prior to entry into the printing, overlay or laminate application areas.

On entry into the laminator 20, cards are passed through the driven roller 104 and idler roller 108, which are manufactured from a compound of soft rubber-like material. As cards pass between the rollers, debris are transferred from the cards to the rollers, and "cleaned" cards are presented to the printing or laminating station 20.

A tape cleaning mechanism 180 is used to perform the aforementioned task. The tape cleaning mechanism 180 is mounted below roller 104, and contains a supply reel 182' of a web of tape 184 that is sticky on the upper side. The cleaning tape 184 is fed past guide rod 186 to between a nip between idler roller 188 and driven roller 104 where transfer of debris accumulated on rollers 104 and 108 occurs. The cleaning tape 184 on which the debris is attached is taken up by motor driven take up reel 190 which is driven by axle 192 which is driven by cleaning tape take up motor 214 described below in conjunction with FIG. 4. The upper sticky surface of the cleaning tape 194 contacts with the roller 104, thereby transferring debris from the rollers 104 and 108 to the sticky surface of the cleaning tape. As this transfer takes place, debris from the idler roller 108 is also transferred to the driven roller 104, and thereafter transferred to the sticky surface of the cleaning tape. This cleaning operation occurs for a selected period of tape length or roller rotation, and occurs at a rate known as a cleaning cycle. The number of cards produced before a cleaning cycle is performed is controlled through operator adjustable settings in the system controller 602 described below.

Figure 3:
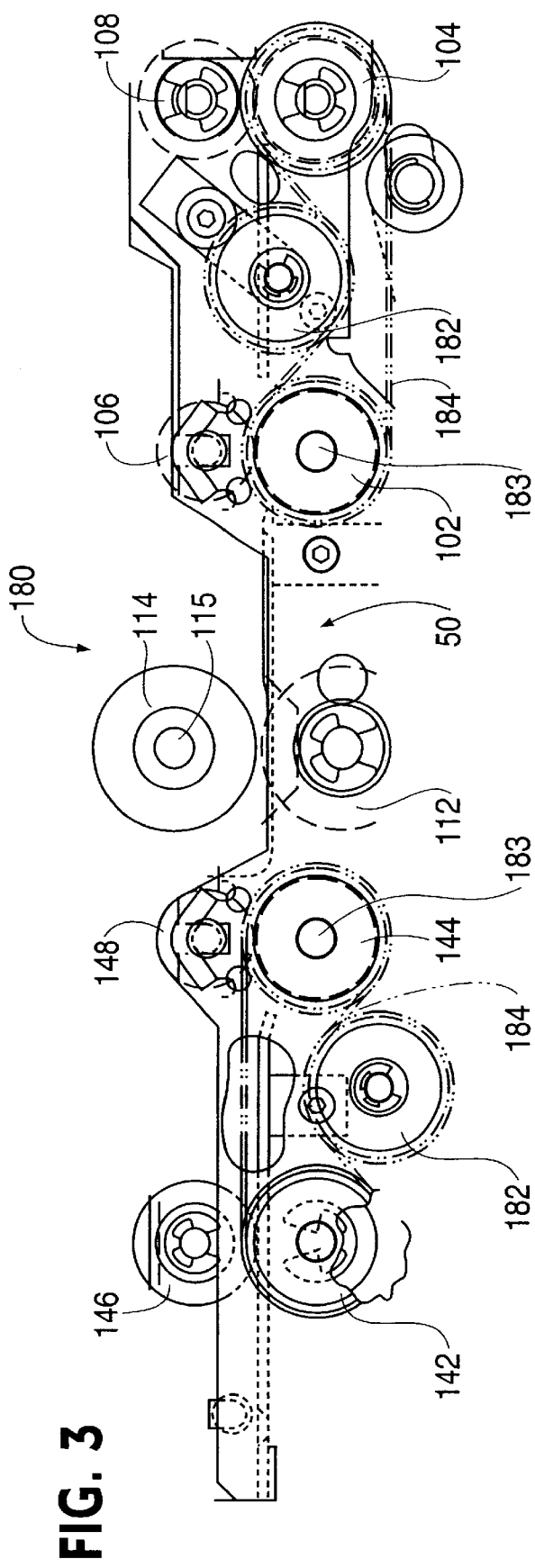
FIG. 3 illustrates a view of the card transport mechanism used with the embodiment of FIG. 2.

FIG. 3 illustrates an embodiment of a drive mechanism 180 used to drive individual cards along the transport path 50 of the embodiment of FIG. 2. Each of the first and second pairs of driven rollers 102, 104, 142 and 144 and driven roller 112 are driven by a transmission (not illustrated) which is driven by the single card transport motor 202 illustrated in FIG. 4.

The card transport motor 204, through a series of belt drives (not illustrated) drives driven rollers 102, 144 and 112. The driven rollers 102 and 144 are driven by shafts 183 through the aforementioned belt driven transmission and the driven roller 112 is driven by the aforementioned belt driven transmission. Idler gears 182 and 186 respectively tension the chains 184 and 188. The chains 184 and 188 drive the outboard driven rollers 104 and 142.

Figure 4:
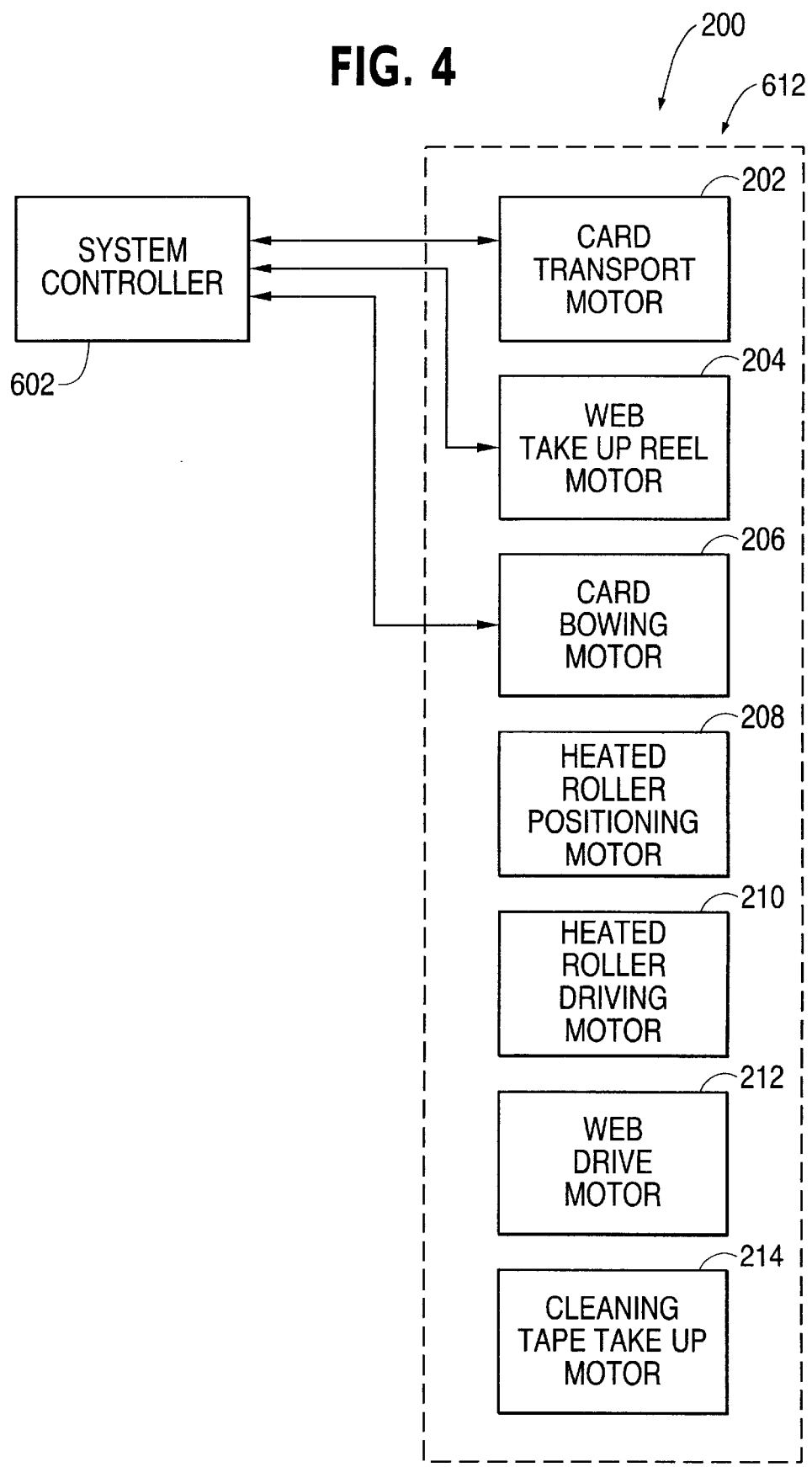
FIG. 4 illustrates a block diagram of the controller of a laminator in accordance with the present invention.

FIG. 4 illustrates a block diagram of a controller 200 which may be used in accordance with the present invention. However, it should be understood that the invention is not limited thereto. The system controller 602 may include a microprocessor controlled processor such as, but not limited to, a PC and a microprocessor based printed circuit board (not illustrated).

The microprocessor-based printed circuit board in a preferred embodiment receives executable code, configuration data, and commands from a host computer via an Arcnet network. The printed circuit board provides for the electronic control of the heated roller 114 and the bowing station 40.

The lamination station 20 and bowing station 40 has many functions. The laminating station 20 accepts foil of varying panel widths. An optional foil refresh feature skips cards that were left under the heated roller 114 for longer than a user-adjustable period. The printed circuit board of the system controller 602 provides adjustable foil tracking which ensures that the position of applied laminate is in position; provides adjustable application temperature and speed; and adjustable card straightening time.

When the laminator 10 is powered up, the program (executable code) is downloaded from a host computer of the system controller 602 such as the controller described in the aforementioned patent of the Assignee and as used in the Assignee's HORIZON embosser and printing system.

At the beginning of each job, the configuration data including user-adjustable settings are downloaded from the host computer of the system controller 602.

The process of applying clear plastic laminating material to the card is as follows:

1. The card is pulled into the laminator 10 in response to a command from the host computer of the system controller 602 by activating the card transport motor 202 and detecting the leading edge of the card with an optical sensor (not illustrated) at the input of the heated roller's card track.
2. In response to a command from the host computer of the system controller, the laminate application process is started by moving the card into position under the heated roller 22, 114. The card is positioned by advancing the card transport motor 204 an adjustable number of steps ("Roller Xstart") past the position where the back edge of the card was detected at the input optical sensor.
3. The web 35, 113 is moved into place by activation of the web take up motor 204 and advancing an adjustable number of foil encoder pulses ("Foil Home") past the point where the foil index was detected in the optical foil sensor.
4. The heated roller 22, 114 is then lowered by the heated roller positioning motor 208 to press the foil 35, 113 onto the card. The heated roller 22, 114 is lowered under control of a heated roller positioning mechanism (not illustrated) driven by heated roller positioning motor 208. The system controller 602 controls the heated roller positioning motor 208.
5. The heated roller 22, 114 remains lowered until the card transport advances to an adjustable number of steps ("Roller Xend") past the position where the back edge of the card was detected by the optical input sensor. The rate of travel during application is determined by the "Roller Speed" setting. The heated roller 22, 114 is rotated by a heated roller driving motor 210 which is controlled by system controller 602 so that the rate of rotation of the heated roller 22, 114 is synchronized with the speed of driving the card by the driven roller 24, 112.
6. When the heated roller 22, 114 is raised by the heated roller positioning motor, the card is advanced to an adjustable eject position and the web take up reel motor 204 is turned on until the web 35, 113 is advanced to the next laminate 16 or position of transfer of laminating material from the web on the foil (see step 3).
7. The bowing station 40 is activated by turning on the card bowing motor 206 until the cam 156 rotates 180 degrees, pausing for an adjustable amount of time ("Straighten Time") while the card is bent upwards, and then turning the card bowing motor 206 back on until the straightener cam rotates 180 degrees more.

An encoder wheel and optical sensor (not illustrated) allows the system controller 602 to track and control foil motion with a resolution of 0.032 inches in a commercial embodiment of the invention. If excessive stray foil motion (greater than "Foil Tolerance" steps of the encoder is detected, an error will be indicated and the card will be rejected.

Figure 5:
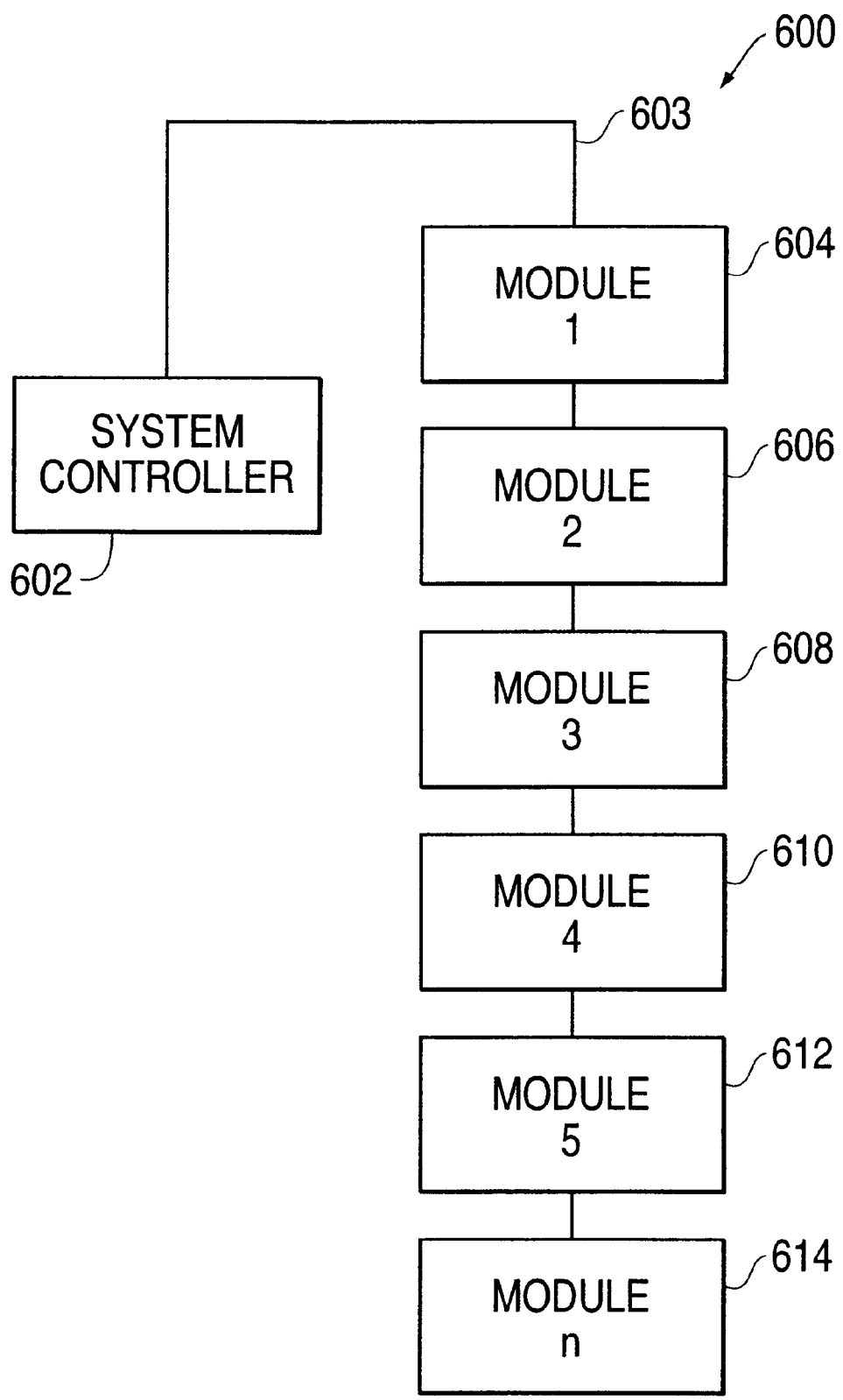
FIG. 5 illustrates a block diagram of a credit card embossing and printing system which includes a laminator in accordance with the present invention.

FIG. 5 illustrates the application of the present invention as module 612 in a credit card embossing system in accordance with U.S. Pat. No. 5,837,991 which is used to process cards which are not embossed. The system controller 602 is the same system controller utilized in FIG. 4 and controls individual modules 604, 606, 608, 610, 612 and 614 as described in U.S. Pat. No. 5,837,991 to provide an inline card processing process, without the embossing station being activated, in which the processed cards are laminated.

While the present invention has been described in terms of its preferred embodiments, it should be understood that numerous modifications may be made thereto without departing from the spirit and scope of the present invention. It is intended that all such modifications fall within the scope of the appended claims.

What is claimed is:

1. A laminator comprising:
   an infeed which supplies plastic cards which are to be laminated with a plastic laminating material on a first side of each card;
   a laminating station having a heated roller and a card support, opposed to the heated roller, which supports a second side of each plastic card and is separated from the heated roller to define a card opening through which each plastic card passes when being laminated;
   a plastic laminating material source which feeds plastic laminating material into the card opening between the heated roller and the first side of each plastic card with heat from the heated roller heating the plastic laminating material and each plastic card in the card opening to fuse the plastic laminating material to the first surface of each plastic card to produce laminated plastic cards; and
   a card bowing station, located at an outfeed of the laminating station, including a resilient member which moves from a withdrawn position into transverse contact with a portion of the second side of each plastic card relative to a direction of movement of each plastic card through the laminator, while each laminated plastic card retains heat from being laminated, to bow each plastic card sufficiently in the portion to cause each laminated plastic card when cooled to be substantially flat.

2. A laminator in accordance with claim 1 wherein the laminate source comprises:
   a web which provides plastic laminating material which is heat fused onto the first side of each card;
   a source reel on which the web is wound; and
   a take up reel on which the web is wound after the plastic laminating material is fused to the first side of the plastic cards.

3. A laminator in accordance with claim 1 comprising:
   at least three driven rollers which contact one side of each card wherein at least one driven roller is located along a card transport path at the infeed and a pair of driven rollers are disposed along the card transport with a first driven roller of the pair of driven rollers being located between the heated roller and the resilient member and the second driven roller of the pair of driven rollers being located at the outfeed of the card bowing station.

4. A laminator in accordance with claim 2 comprising:
   at least three driven rollers which contact one side of each card wherein at least one driven roller is located along a card transport path at the infeed and a pair of driven rollers are disposed along the card transport with a first driven roller of the pair of driven rollers being located between the heated roller and the resilient member and the second driven roller of the pair of driven rollers being located at the outfeed of the card bowing station.

5. A laminator in accordance with claim 3 wherein:
   the at least three rollers are driven by one motor.

6. A laminator in accordance with claim 4 wherein:
   the at least three rollers are driven by one motor.

7. A laminator in accordance with claim 3 comprising:
   at least three idler rollers which contact each card on another side of each card and are individually opposed to the individual driven rollers of the at least three driven rollers, with each card passing between a driven roller and the opposed idler roller when driven by each driven roller contacting the one side of each card and the opposed idler roller contacting the another side.

8. A laminator in accordance with claim 4 comprising:
   at least three idler rollers which contact each card on another side of each card and are individually opposed to the individual driven rollers of the at least three driven rollers, with each card passing between a driven roller and the opposed idler roller when driven by each driven roller contacting the one side of each card and the opposed idler roller contacting the another side.

9. A laminator in accordance with claim 5 comprising:
   at least three idler rollers which contact each card on another side of each card and are individually opposed to the individual driven rollers of the at least three driven rollers, with each card passing between a driven roller and the opposed idler roller when driven by each driven roller contacting the one side of each card and the opposed idler roller contacting the another side.

10. A laminator in accordance with claim 6 comprising:
    at least three idler rollers which contact each card on another side of each card and are individually opposed to the individual driven rollers of the at least three driven rollers, with each card passing between a driven roller and the opposed idler roller when driven by each driven roller contacting the one side of each card and the opposed idler roller contacting the another side.

11. A laminator in accordance with claim 3 comprising:
    a controller and first, second and third motors; and wherein
    the first motor drives the at least three driven rollers, the second motor drives the resilient member, and the third motor moves the heated roller into contact with the laminating material and the controller controls activation of the motors.

12. A laminator in accordance with claim 11 wherein:
    the first motor is activated under control of the controller to drive each card along the card transport path to drive each card past the heated roller and into a stopped position where each card is contacted by the pair of driven rollers and after each card is in the stopped position, the second motor is activated under control of the controller to move the part including the resilient member to bow the portion thereof.

13. A laminator in accordance with claim 4 comprising:
    a controller and first, second and third motors; and wherein
    the first motor drives the at least three driven rollers, the second motor drives the resilient member, and the third motor moves the heated roller into contact with the laminating material and the controller controls activation of the motors.

14. A laminator in accordance with claim 13 wherein:
    the first motor is activated under control of the controller to drive each card along the card transport path to drive each card past the heated roller and into a stopped position where each card is contacted by the pair of driven rollers and after each card is in the stopped position, the second motor is activated under control of the controller to move the part including the resilient member to bow the portion thereof.

15. A laminator in accordance with claim 5 comprising:

a controller and first, second and third motors; and wherein the first motor drives the at least three driven rollers, the second motor drives the resilient member, and the third motor moves the heated roller into contact with the laminating material and the controller controls activation of the motors.

16. A laminator in accordance with claim 15 wherein:

the first motor is activated under control of the controller to drive each card along the card transport path to drive each card past the heated roller and into a stopped position where each card is contacted by the pair of driven rollers and after each card is in the stopped position, the second motor is activated under control of the controller to move the part including the resilient member to bow the portion thereof.

17. A laminator in accordance with claim 6 comprising:

a controller and first, second and third motors; and wherein the first motor drives the at least three driven rollers, the second motor drives the resilient member, and the third motor moves the heated roller into contact with the laminating material and the controller controls activation of the motors.

18. A laminator in accordance with claim 17 wherein:

the first motor is activated under control of the controller to drive each card along the card transport path to drive each card past the heated roller and into a stopped position where each card is contacted by the pair of driven rollers and after each card is in the stopped position, the second motor is activated under control of the controller to move the part including the resilient member to bow the portion thereof.

19. A laminator in accordance with claim 7 comprising:

a controller and first, second and third motors; and wherein the first motor drives the at least three driven rollers, the second motor drives the resilient member, and the third motor moves the heated roller into contact with the laminating material and the controller controls activation of the motors.

20. A laminator in accordance with claim 19 wherein:

the first motor is activated under control of the controller to drive each card along the card transport path to drive each card past the heated roller and into a stopped position where each card is contacted by the pair of driven rollers and after each card is in the stopped position, the second motor is activated under control of the controller to move the part including the resilient member to bow the portion thereof.

21. A laminator in accordance with claim 8 comprising:

a controller and first, second and third motors; and wherein the first motor drives the at least three driven rollers, the second motor drives the resilient member, and the third motor moves the heated roller into contact with the laminating material and the controller controls activation of the motors.

22. A laminator in accordance with claim 21 wherein:

the first motor is activated under control of the controller to drive each card along the card transport path to drive each card past the heated roller and into a stopped position where each card is contacted by the pair of driven rollers and after each card is in the stopped position, the second motor is activated under control of the controller to move the part including the resilient member to bow the portion thereof.

23. A laminator in accordance with claim 9 comprising:

a controller and first, second and third motors; and wherein the first motor drives the at least three driven rollers, the second motor drives the resilient member, and the third motor moves the heated roller into contact with the laminating material and the controller controls activation of the motors.

24. A laminator in accordance with claim 23 wherein:

the first motor is activated under control of the controller to drive each card along the card transport path to drive each card past the heated roller and into a stopped position where each card is contacted by the pair of driven rollers and after each card is in the stopped position, the second motor is activated under control of the controller to move the part including the resilient member to bow the portion thereof.

25. A laminator in accordance with claim 10 comprising:

a controller and first, second and third motors; and wherein the first motor drives the at least three driven rollers, the second motor drives the resilient member, and the third motor moves the heated roller into contact with the laminating material and the controller controls activation of the motors.

26. A laminator in accordance with claim 25 wherein:

the first motor is activated under control of the controller to drive each card along the card transport path to drive each card past the heated roller and into a stopped position where each card is contacted by the pair of driven rollers and after each card is in the stopped position, the second motor is activated under control of the controller to move the part including the resilient member to bow the portion thereof.

27. A laminator in accordance with claim 1 wherein:

the laminator is part of a card processing system.

28. A laminator in accordance with claim 1 wherein:

the resilient member is a reciprocating part, and the transverse contact is with a middle portion of the second side.

29. A laminator in accordance with claim 2 wherein:

the plastic laminating material is a series of plastic laminates which are spaced apart on a carrying web with the laminates being transferred from the web to the first side of the plastic cards by heat from the heated roller.

30. A laminator in accordance with claim 2 wherein:

the plastic laminating material is continuously coated on one side of a carrying web with the laminating material being transferred from the web to the first side of the plastic cards by heat from the heated roller.

* * * * *